(12) United States Patent
Savant et al.

(10) Patent No.: US 8,840,156 B2
(45) Date of Patent: Sep. 23, 2014

(54) HANDLE FOR A DOOR LEAF OF AN AUTOMOBILE

(75) Inventors: Fiorenzo Savant, Creteil Cedex (FR); Guillaume Lesueur, Creteil Cedex (FR)

(73) Assignee: VALEO S.p.A., Santena (TO) (IT)

( * ) Notice: Subject to any disclaimer, the term of this patent is extended or adjusted under 35 U.S.C. 154(b) by 336 days.

(21) Appl. No.: 13/320,554

(22) PCT Filed: May 20, 2010

(86) PCT No.: PCT/EP2010/003115
§ 371 (c)(1),
(2), (4) Date: Nov. 15, 2011

(87) PCT Pub. No.: WO2010/133372
PCT Pub. Date: Nov. 25, 2010

(65) Prior Publication Data
US 2012/0061162 A1    Mar. 15, 2012

(30) Foreign Application Priority Data
May 21, 2009 (IT) ............... MI2009A0896

(51) Int. Cl.
| | |
|---|---|
| *E05B 3/00* | (2006.01) |
| *A47B 47/00* | (2006.01) |
| *F16B 12/40* | (2006.01) |
| *E05B 77/06* | (2014.01) |
| *E05B 85/16* | (2014.01) |

(52) U.S. Cl.
CPC ............ *A47B 47/0008* (2013.01); *E05B 85/16* (2013.01); *F16B 12/40* (2013.01); *E05B 77/06* (2013.01); *Y10S 292/22* (2013.01)
USPC ................................. 292/336.3; 292/DIG. 22

(58) Field of Classification Search
USPC ....................................... 292/336.3, DIG. 22
See application file for complete search history.

(56) References Cited

U.S. PATENT DOCUMENTS 3,719,248 A * 3/1973 Breitschwerdt et al. ...... 180/271
6,672,633 B2 * 1/2004 Nomura et al. ............ 292/336.3
(Continued)

FOREIGN PATENT DOCUMENTS

| | | |
|---|---|---|
| DE | 10 2005 049144 A1 | 4/2007 |
| EP | 1 593 802 A1 | 11/2005 |
| EP | 2 053 186 A1 | 4/2009 |

OTHER PUBLICATIONS

International Search Report w/translation from PCT/EP2010/003115 dated Oct. 4, 2010 (4 pages).

*Primary Examiner* — Carlos Lugo
(74) *Attorney, Agent, or Firm* — Osha Liang LLP (57) ABSTRACT

A handle for a door leaf of an automobile includes a gripping lever rotatably movable relative to the door leaf about a first axis of rotation between an inoperative position and a control position for opening a lock of the door leaf; a transmission lever mounted in a base of the handle attached to the door leaf, the transmission lever configured to be actuated by the gripping lever and to pivot about a second axis of rotation between inoperative and operative positions in which the transmission lever actuates the opening of the lock; and a safety system mounted in the base, configured to prevent the rotation of the transmission lever in the event of a crash. The safety system includes two inertial bodies pivotably mounted between inoperative and operative positions, preventing the rotation of the transmission lever in the event of a crash.

10 Claims, 7 Drawing Sheets

(56) References Cited

U.S. PATENT DOCUMENTS

| | | |
|---|---|---|
| 6,709,033 B2 * | 3/2004 | Jooss et al. ............... 292/336.3 |
| 6,749,236 B2 * | 6/2004 | Nomura et al. ........... 292/336.3 |
| 7,059,641 B2 * | 6/2006 | Chanya ..................... 292/336.3 |
| 7,232,164 B2 * | 6/2007 | Lee ........................... 292/336.3 |
| 7,303,217 B2 * | 12/2007 | Savant ...................... 292/336.3 |
| 7,431,357 B2 * | 10/2008 | Pudney ..................... 292/336.3 |
| 7,562,916 B2 * | 7/2009 | Cummins et al. .......... 292/336.3 |
| 7,597,368 B2 * | 10/2009 | Savant et al. .............. 292/336.3 |
| 8,029,032 B1 * | 10/2011 | Yang ......................... 292/336.3 |
| 8,333,415 B2 * | 12/2012 | Chang et al. .............. 292/336.3 |
| 8,366,159 B2 * | 2/2013 | Patel ......................... 292/336.3 |

\* cited by examiner

HANDLE FOR A DOOR LEAF OF AN AUTOMOBILE

The invention relates to a handle for a door leaf of an automobile, in particular a handle for a side door.

To meet various safety standards, in particular in the event of a side collision, the side handles of an automobile which are currently known are provided with an inertial system. Said inertial system is triggered in the event of a side collision against the door and locks the gripping lever to prevent untimely opening of the side door which could cause the ejection of the passenger from the vehicle.

Said known handles comprise a gripping lever which is mobile in rotation relative to the door leaf between an inoperative position and a control position. Said gripping lever is able to act on a transmission lever which is intended to actuate the opening of a lock of the door leaf via a rod assembly or Bowden cables.

The inertial system consists in the known manner of an inertial body and locking lug fixed to said inertial body which cooperates with a shoulder of the transmission lever to lock said lever in the event of a side collision in a position in which it is not able to act to open the lock.

In the known inertial systems, the inertial body in the operative position locks the transmission lever either in a non-reversible or reversible manner.

For example, the drawback of a safety system of the non-reversible type is that in the event of a low-impact collision, i.e. at low acceleration, or even accidents during assembly, the handle is completely locked.

The drawback of a safety system of the reversible type is that in the event of a higher-impact collision or series of collisions or accelerations, is that the handle may be opened in an untimely manner.

To remedy said drawbacks, several known solutions propose to calibrate the inertial system for high acceleration and to use a counterweight in the region of the transmission lever to balance the weight of the handle which prevents the handle from being completely locked in the event of a low-impact collision.

However, with these solutions the mass and overall bulk of the support of a handle increase considerably.

The present invention aims to remedy said drawbacks of the prior art by proposing a handle, the inertial safety system thereof being optimized.

To this end, the subject of the invention is a handle for a door leaf of an automobile comprising:
- a gripping lever which is mobile in rotation relative to the door leaf about a first axis of rotation between an inoperative position and a control position for opening a lock of the door leaf,
- a transmission lever mounted in a base 5 of the handle fixed to the door leaf, the transmission lever being configured so as to be actuated by the gripping lever and to pivot about a second axis of rotation between an inoperative position and an operative position in which the transmission lever actuates the opening of the lock, and
- a safety system mounted in the base, configured to prevent the rotation of the transmission lever in the event of a collision, characterized in that the safety system comprises two inertial bodies, pivotably mounted between an inoperative position and an operative position, preventing the rotation of the transmission lever, one of said bodies being locked in the operative position in a non-reversible manner.

Thus, it is possible to prevent untimely opening of the door leaf in the event of a collision, both at low acceleration and high acceleration.

Moreover, said safety system makes it possible to lock the transmission lever in a reversible manner in the event of collisions at low acceleration, due to the first inertial body which prevents the handle from being completely locked, whilst ensuring non-reversible locking of the transmission lever, directly or indirectly, due to the second inertial body, in the event of greater acceleration.

More specifically, said safety system comprises a means for locking the second inertial body in the operative position to lock the transmission lever in rotation, or any other element of the kinematic system for opening said door leaf, and in a non-reversible manner.

Advantageously, the first inertial body comprises a locking lug which cooperates with a first shoulder of the transmission lever to lock said transmission lever in rotation in the event of a collision.

Said second inertial body may comprise a locking lug which cooperates with a second shoulder of the transmission lever to lock the transmission lever in rotation, in a direct manner, in the event of a collision.

Alternatively, said second inertial body is configured to lock the first inertial body in the operative position. More specifically, the second inertial body is configured to lock the transmission lever by locking the first inertial body in the operative position.

Alternatively, the second inertial body is configured to lock both the transmission lever and the first inertial body in the operative position and in a direct manner.

To this end, the second inertial body has an opening to receive a protuberance of the first inertial body in the operative position.

Advantageously, said locking means of the second inertial body comprises a flexible strip cooperating with a projection of the second inertial body.

According to a further embodiment, the locking means of the second inertial body comprises a locking wedge of substantially parallelepiped overall shape, arranged on the base opposite one end of the second inertial body, such that when the second inertial body pivots, the second inertial body:
- slides along a longitudinal wall of the locking wedge in a first direction, then
- slides along a side wall of the locking wedge in a second direction substantially perpendicular to the first direction, said side wall forming a stop locking the second inertial body in the operative position.

Advantageously, said second axis of rotation is substantially perpendicular to the first axis of rotation. Alternatively, said second axis of rotation is substantially parallel to the first axis of rotation.

Figure 1:
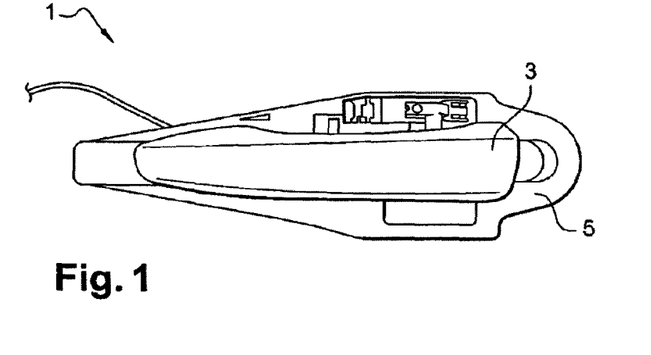
FIG. 1 shows a perspective view of a handle.

Further features and advantages of the invention will be revealed from the following description, provided by way of non-limiting example, with reference to the accompanying drawings, in which:

FIG. 1 shows a perspective view of a handle 1 of a door leaf of an automobile, in particular of a side door.

The handle 1 of a door leaf comprises a gripping lever 3 which is accessible from the exterior of the vehicle and on which a user pulls toward the outside to open the door.

Said lever 3 is connected to a fixed part 5, also known as a base or handle support, which is intended to be mounted inside the door, more specifically behind the external face of the door and which is thus not visible once mounted on the vehicle.

The handle 1 is in this case a handle of the "fridge" type and the gripping lever 3 is mobile in rotation relative to the base 5.

More specifically, the gripping lever 3 may pivot about a first axis of rotation Z between an inoperative position and a control position to open a lock of the door leaf when the user pulls on said gripping lever 3. Said first axis of rotation Z is substantially parallel to the axis of rotation of the door.

Figure 2:
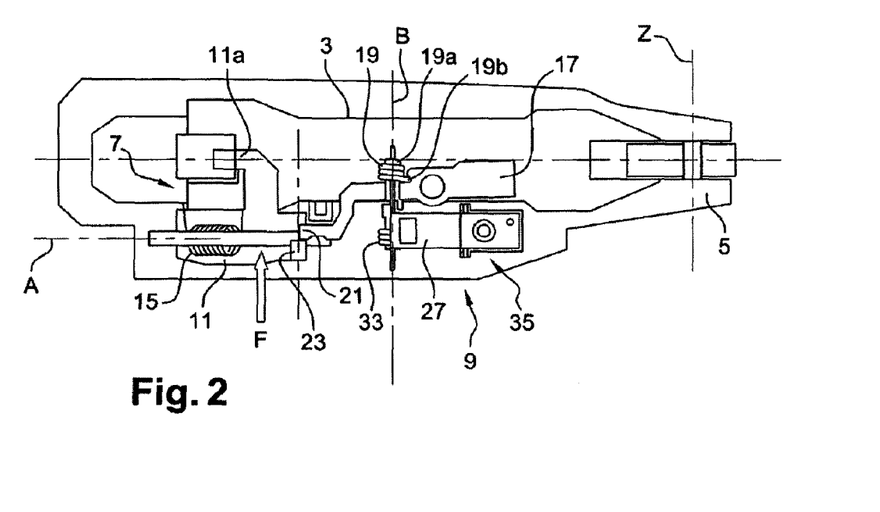
FIG. 2 shows a schematic view of the rear of the handle of FIG. 1 according to a first embodiment.

A first embodiment of said base 5 is shown in FIG. 2. The base 5 comprises a transmission mechanism 7 to connect the gripping lever 3 to the opening mechanism of the door and an inertial safety system 9 to avoid untimely opening of the door leaf in the event of a collision.

The transmission mechanism 7 comprises a transmission lever 11 mounted in a housing of the base 5.

The base 5 is, for example, produced by injection-molding in a plastics material or a die-cast metal. Moreover, said transmission lever 11 is pivotably mounted about a second axis of rotation A between an inoperative position and an operative position in which the transmission lever 11 actuates the opening of the lock.

Figure 3:
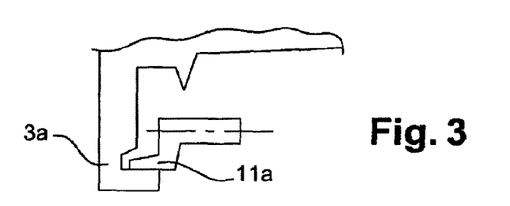
FIG. 3 shows a detailed view of the connection between the gripping lever and the transmission lever of the handle of FIG. 1.

In order to connect mechanically the transmission lever 11 to the gripping lever 3, so that the transmission lever 11 rotates about the second axis A in the base 5 when the gripping lever 3 is pulled by the user, the end of the gripping lever 3 has an extension 3a (seen most clearly in FIG. 3) which extends into the base 5, forming a notch in which a tongue 11a of the transmission lever 11 is engaged in rotation. The tongue 11a is, for example, made of the same material as the transmission lever 11.

According to said first embodiment, the second axis of rotation A is substantially perpendicular to the first axis of rotation Z of the gripping lever 3.

A return means, in this case in the form of a helicoidal spring 15, is arranged coaxially to the second axis of rotation A of the transmission lever 11 to return the transmission lever 11 and the gripping lever 3 into the inoperative position when the user no longer pulls on the gripping lever 3.

Moreover, the transmission mechanism 7 also comprises a transmission pulley (not shown). The transmission pulley may comprise a guide groove intended to receive an actuating cable (not shown) connected to the door mechanism, more specifically the lock (not shown). Thus, when the transmission lever 11 is displaced into the operative position, the transmission pulley pivots about the second axis of rotation A in the direction illustrated by the arrow F, and the cable actuates the opening of the lock.

The transmission pulley is fixed to the transmission lever 11 and is, for example, arranged outside the base 5.

Moreover, the inertial system 9 comprises a first inertial body 17 articulated to the base 5 or a part fixed to said base 5. As may be seen in FIG. 2, the first inertial body 17 extends along a horizontal axis, in this case the longitudinal axis of the gripping lever 3.

The first inertial body 17 is pivotably mounted relative to the base 5, about a third axis of rotation B between an inoperative position and an operative position in which the transmission lever 11 is locked in rotation.

According to said first embodiment, said third axis of rotation B is substantially perpendicular to the second axis A and substantially parallel to the first axis of rotation Z.

Moreover, a restoring spring 19, for example of the helicoidal type, makes it possible to return the first inertial body 17 into the inoperative position.

The helicoidal spring in this case is centered on the third axis of rotation B, with one end 19a in contact with a support of the base 5 and the other end 19b in contact with the first inertial body 17.

Figure 4:
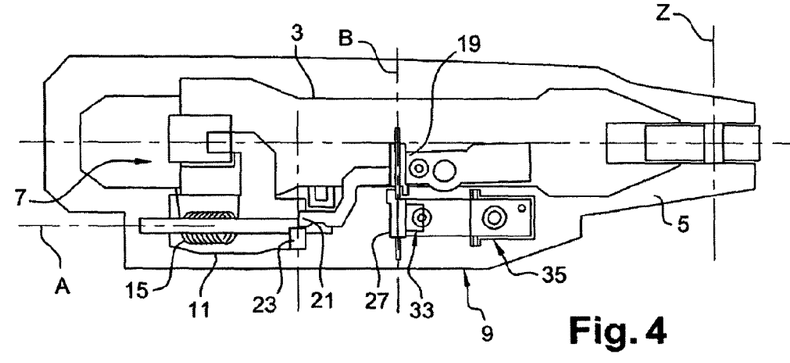
FIG. 4 is a variant of the view shown in FIG. 2.

As a variant, it is possible to provide a compression spring (see FIG. 4).

Moreover, the first inertial body 17 is designed to pivot when it is subjected to low acceleration, for example in the order of 15-20 G (1 G corresponds to 9.80665 m s$^{-2}$).

The first inertial body 17 carries at one end a locking lug 21 which cooperates with a shoulder 23 of the transmission lever 11 when the first inertial body 17 is pivoted.

Figure 5A:
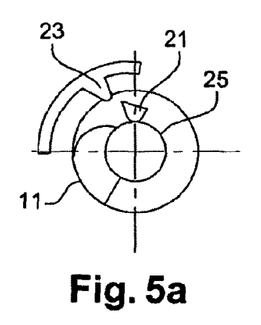
FIG. 5a is a sectional view of FIG. 2 showing the transmission lever and a first inertial body in the inoperative position.
Figure 5B:
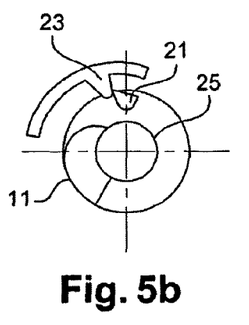
FIG. 5b is a sectional view of FIG. 2 showing the transmission lever and a first inertial body in the intermediate position.
Figure 5C:
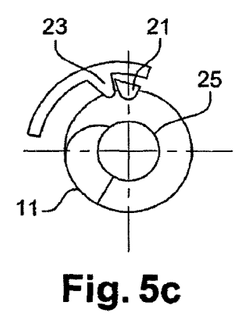
FIG. 5c is a sectional view of FIG. 2 showing the transmission lever and a first inertial body in the operative position.

With reference to FIGS. 5a to 5c, it may be seen that the transmission lever 11 has a cam surface 25 capable of cooperating with the locking lug 21 of the first inertial body 17.

During normal opening of the door, the transmission lever 11 is driven in rotation and the locking lug 21 slides on the surface 25 without the locking lug 21 coming into contact with the shoulder 23, the first inertial body 17 being immobile in the inoperative position (FIG. 5a).

In contrast, in the event of a collision, if the gripping lever 3 is subjected to a force which would open said gripping lever, the first inertial body 17 is also subjected to the same force such that the first inertial body 17 pivots, overcoming the force of the spring 19. Said spring causes the locking lug 21 to be displaced (FIG. 5b) until it intercepts the shoulder 23 and locks the transmission lever 11 at the start of the rotation of the transmission lever 11 (FIG. 5c).

The first inertial body 17 is not locked in the operative position and, as a result, the transmission lever 11 is locked in a reversible manner.

Referring again to FIG. 2, the inertial system 9 further comprises a second inertial body 27 activated for high acceleration, for example in the order of 100 G.

According to this first embodiment, the second inertial body 27 is mounted in the vicinity of the first inertial body 17, pivotably relative to the base 5, about a fourth axis of rotation coinciding with the third axis of rotation B between an inoperative position and an operative position in which the first inertial body 17 is locked in rotation.

Figure 6A:
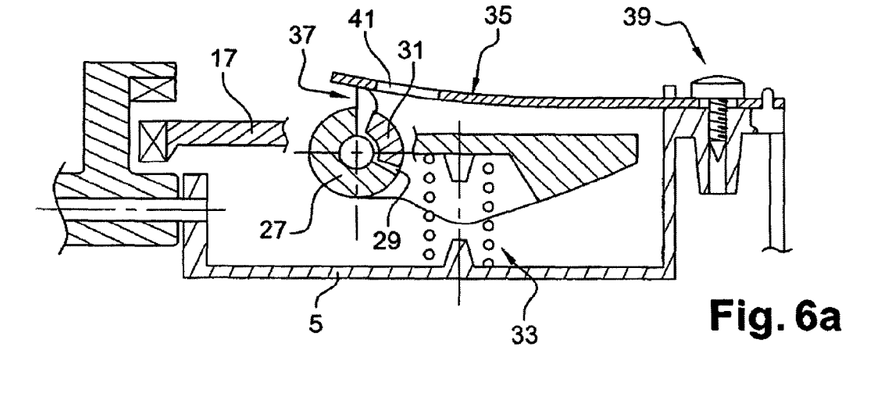
FIG. 6a is a sectional view of FIG. 2 showing schematically two inertial bodies in the inoperative position.
Figure 6B:
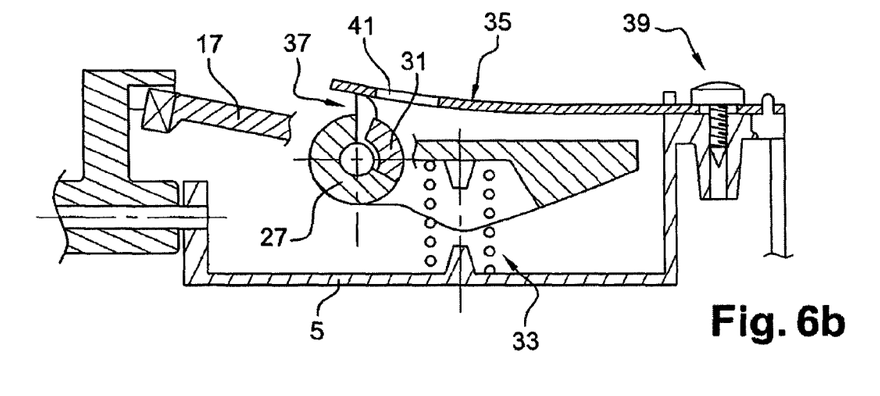
FIG. 6b is a sectional view of FIG. 2 showing schematically a first inertial body in the operative position and a second inertial body in the inoperative position in the event of a low-impact collision.
Figure 6C:
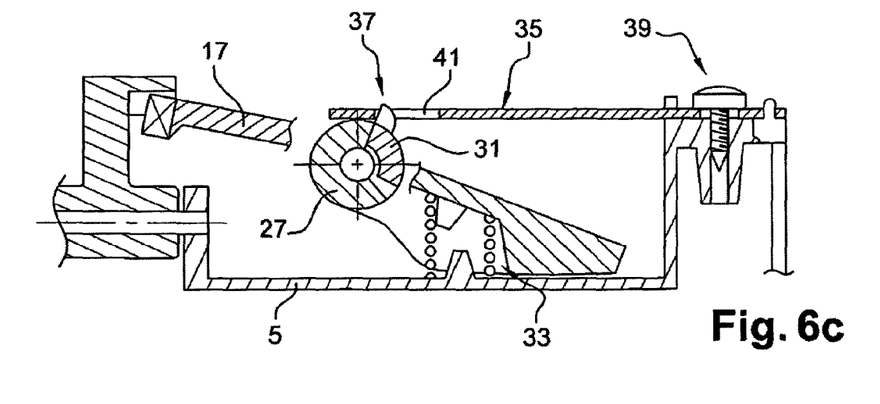
FIG. 6c is a sectional view of FIG. 2 showing schematically two inertial bodies in the operative position in the event of a high-impact collision.

To this end, the second inertial body 27 has an opening or an open sector 29 in which a protuberance 31 of the first inertial body 17 engages in the operative position (see FIG. 6).

Moreover, a restoring spring 33, for example of the helicoidal type, makes it possible to return the second inertial body 27 to the inoperative position.

The helicoidal spring 33 is in this case centered on the third axis of rotation B, with one end in contact with a support of the base 5 and the other end in contact with the second inertial body 27.

As a variant, it is possible to provide a compression spring (see FIG. 4).

As illustrated in FIGS. 6a to 6c, in the event of a low-impact collision or low acceleration, the first inertial body 17 pivots from an inoperative position (see FIG. 6a) to an operative position (see FIG. 6b), driving the protuberance 31 of said first inertial body 17 inside the opening 29 formed in said second inertial body 27. In this case, the second inertial body does not carry out a movement and the first mass is able to return to the inoperative position, in a reversible manner.

In the event of a more violent collision (see FIG. 6c) the first inertial body 17 is already in the operative position and the second inertial body 27 pivots, overcoming the force of the spring 33.

The rotation of the second inertial body 27 thus causes the opening 29 thereof relative to the protuberance 31 of the first inertial body 17 which is fully engaged in said opening 29. Moreover, due to the rotation of the second inertial body 27 in the operative position, the first inertial body 17 is thus locked and not able to return to its inoperative position.

More specifically, the inertial system 9 also comprises a means for locking the second inertial body 27 in its operative position, the vibrations of the second inertial body 27, which are due to the collision, being damped.

As illustrated in FIGS. 6a to 6c, the locking means comprises a resilient strip 35 on which a projection 37 of the second inertial body 27 rests in the inoperative position. Said strip 35 is in this case fixed to the base 5 by one of its ends, for example by being screwed by a screw 39 to a wall of the base 5. As a variant, the strip 35 may also be formed integrally with the base 5.

Said strip 35 comprises a hooking orifice 41 of the projection 37 in the operative position of the second inertial body 27. In this inoperative position, the projection 37 bears against the strip 35 in the vicinity of the hooking orifice 41. When the second inertial body 27 pivots, the projection 37 is displaced toward the hooking orifice 41 and is engaged there to lock the operative position of the second inertial body 27.

Thus, in the inoperative position, during the normal opening of the gripping lever 3, the transmission lever 11 is driven in rotation and the shoulder 23 does not come into contact with the locking lug 21 of the first inertial body 17. Moreover, the projection 37 of the second inertial body 27 bears against the strip 35 in the vicinity of the hooking orifice 41.

In the event of a low-impact collision (low acceleration), the first inertial body 17 pivots about the third axis of rotation B until the locking lug 21 of the first inertial body 17 cooperates with the shoulder 23. The transmission lever 11 is thus immobilized in its inoperative position, in a reversible manner.

More specifically and as illustrated in FIGS. 6a to 6c, during a more violent collision, the second inertial body 27 is accelerated at a greater acceleration and pivots about the third axis of rotation B, overcoming the force of the spring 33 and the protuberance 31 of the first inertial body 17 engages in the opening 29 of the second inertial body 27. At the same time, due to the pivoting of the second inertial body 27, the projection 37 of the second inertial body 27 slides on the strip 35 in the direction of the hooking orifice 41 and is hooked therein.

In this position, the second inertial body 27 is locked and is not able to continue to vibrate or return to the inoperative position. The second inertial body 27 locks, therefore, the first inertial body 17 in a non-reversible manner, effectively preventing any displacement of the transmission lever 11 and thus untimely opening of the door.

Figure 7:
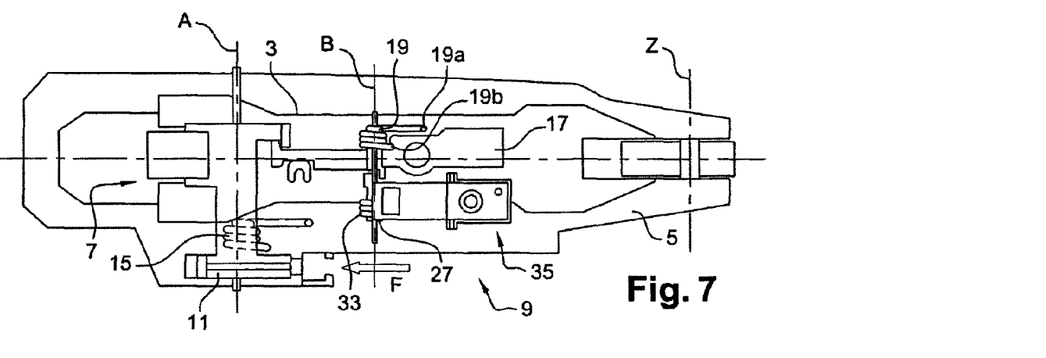
FIG. 7 shows a schematic view of the rear of the handle of FIG. 1 according to a second embodiment.

The second embodiment illustrated in FIG. 7 differs from the first embodiment as the second axis of rotation A of the transmission lever 11 is substantially parallel to the first axis of rotation Z and no longer perpendicular.

The operation of the inertial safety system remains identical to the first embodiment.

A third embodiment is illustrated in FIGS. 8 to 11. In these figures, the elements which are substantially identical to the elements of FIGS. 2 to 7 carry the same reference numerals preceded by 100.

Figure 8:
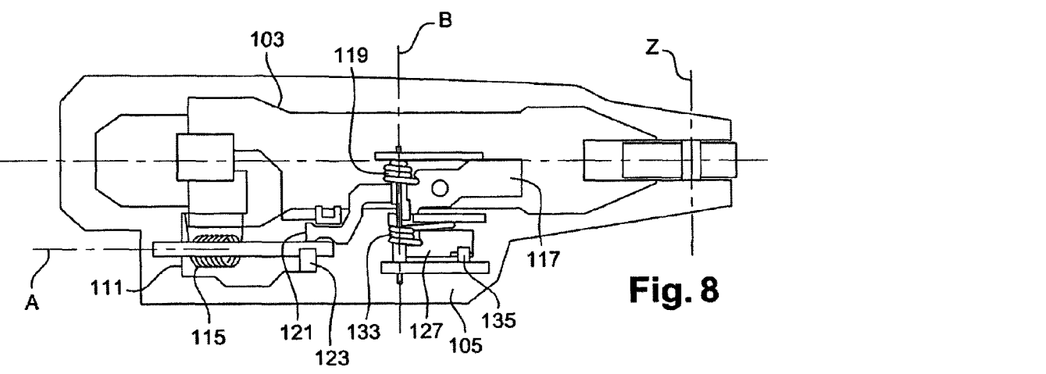
FIG. 8 shows a schematic view of the rear of the handle of FIG. 1 according to a third embodiment.

Said third embodiment differs from the first embodiment in that the locking means of the second inertial body 127 is implemented by a locking wedge 135. Said wedge 135 may be fixed to the base 105 or even made in one piece with the base 105.

Figure 9:
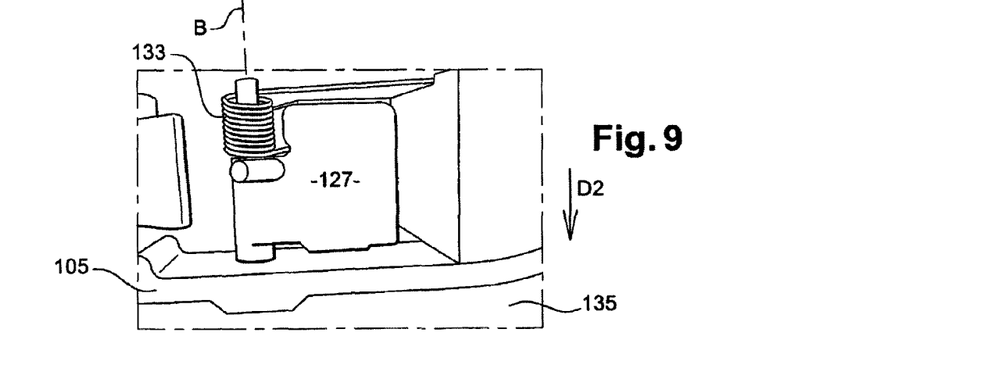
FIG. 9 is a detailed view of the second inertial body in the inoperative position.
Figure 10:
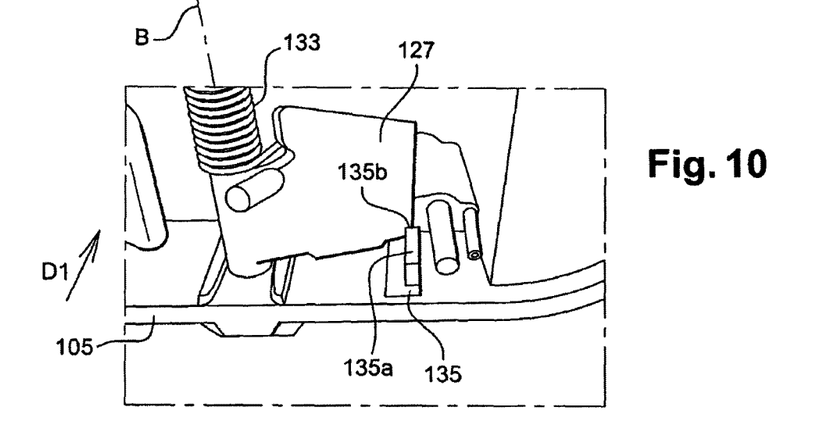
FIG. 10 is a detailed view of the second inertial body locked in the operative position.

As seen in the figures, the wedge 135 is arranged in the vicinity of the second inertial body 127, more specifically below one end of the second inertial body 127.

Said wedge 135 has a substantially parallelepiped overall shape with a longitudinal wall 135a in contact with the second inertial body 127 in the inoperative position and a side wall 135b in contact with the second inertial body 127 in the operative locked position (see FIG. 10).

Thus, in the event of a collision, when the second inertial body 127 rotates about the third axis B, it is also oriented along the longitudinal wall 135a of the wedge 135 in a first direction D1, then the second inertial body 127 is displaced axially relative to the third axis B in a second direction D2 substantially perpendicular to the first direction D1.

Figure 11:
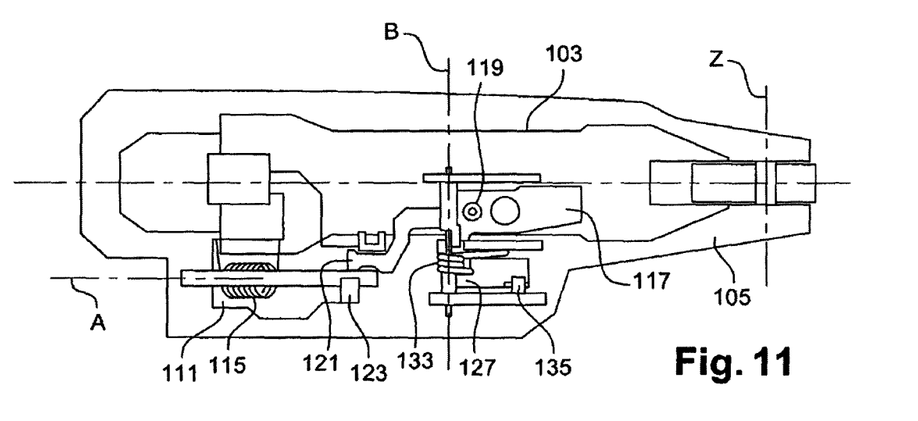
FIG. 11 is a variant of the view shown in FIG. 8.

Moreover, the restoring helicoidal spring 133 opposes the axial displacement in the second direction D2 of the second inertial body 127 and is axially compressed when the second inertial body 127 is axially displaced. Thus, as seen in FIG. 11, it is possible to provide as an alternative a compression spring 119 solely for the first inertial body 117 and a helicoidal spring 133 for the second inertial body 127.

With reference again to FIG. 10, when the second inertial body 127 has passed over the wedge 135 during its rotation, the second inertial body 127 is locked by the side wall 135b of the wedge 135 and is no longer able to rotate about the third axis B.

In order to optimize this locking, it is possible to provide for the second inertial body 127 to comprise a tooth which engages in an associated housing formed on the side wall of the wedge, and conversely the wedge 135 may comprise a tooth on its side wall 135b which engages in an associated housing formed on the second inertial body 127 (not shown).

Such a locking of the second inertial body 127, using the locking wedge, may be deactivated more easily in the event of accidental locking, for example before mounting the handle on a vehicle. By way of example, a screwdriver may be used as a lever in the vicinity of the wedge 135 to lift the second inertial body 127 relative to the wedge 135 and to replace it in the inoperative position.

Figure 12:
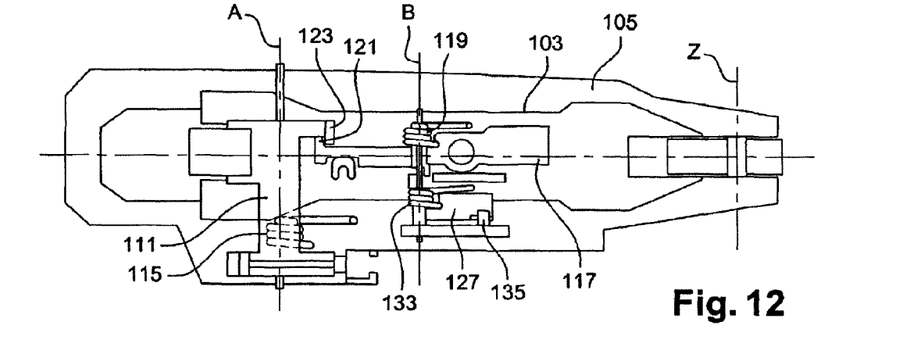
FIG. 12 shows a schematic view of the rear of the handle of FIG. 1 according to a fourth embodiment.

The fourth embodiment illustrated in FIG. 12 differs from the third embodiment in that the second axis of rotation A of the transmission lever 111 is substantially parallel to the first axis of rotation Z and not perpendicular.

Figure 13:
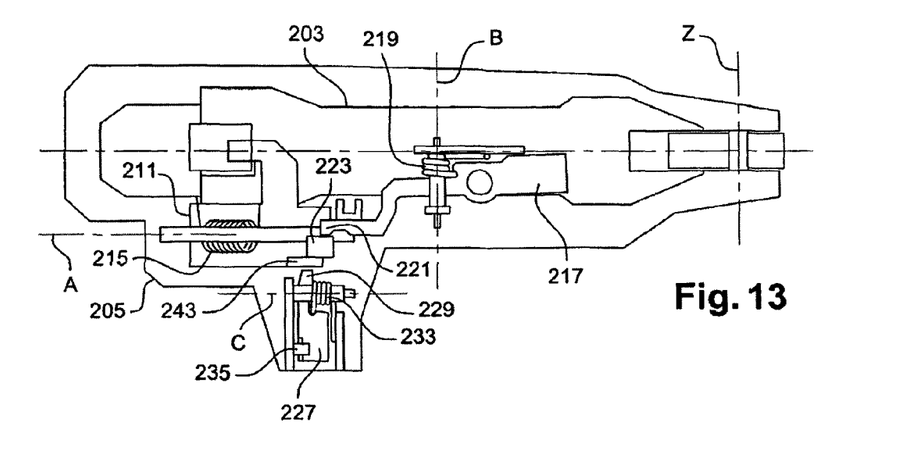
FIG. 13 shows a schematic view of the rear of the handle of FIG. 1 according to a fifth embodiment.
Figure 14:
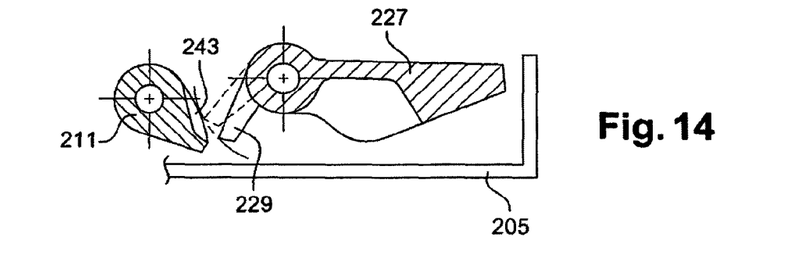
FIG. 14 is a sectional view of FIG. 13 showing the second inertial body and the transmission lever.
Figure 15:
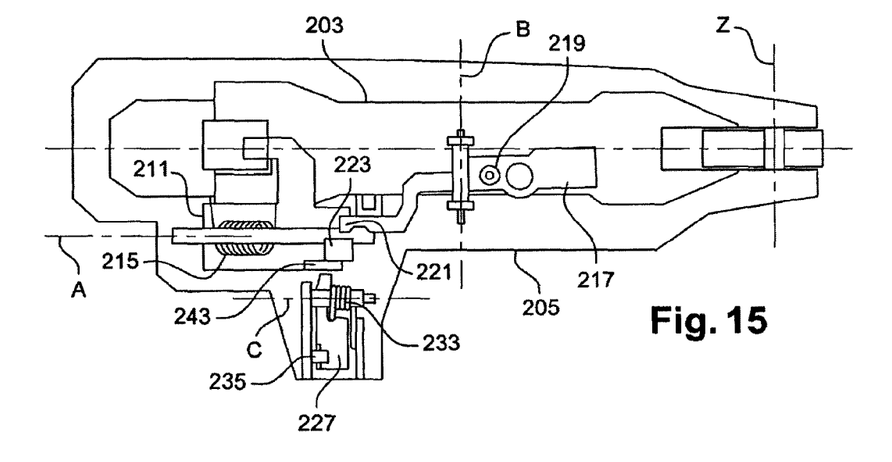
FIG. 15 is a variant of the view shown in FIG. 13.

According to a fifth embodiment, illustrated in FIGS. 13 to 15, the second inertial body acts directly on the transmission lever 11 and no longer via the first inertial body.

On these figures, the elements which are substantially identical to the elements of FIGS. 2 to 7 carry the same reference numerals preceded by 200.

According to this fifth embodiment, the second inertial body 227 is mounted in the vicinity of the transmission lever 211 and no longer the first inertial body 217.

The second inertial body 227 is capable of pivoting relative to the base 205 about a fourth axis of rotation C which no longer coincides with the third axis of rotation B between an inoperative position and an operative position in which the transmission lever 211 is locked in rotation. According to this fifth embodiment, the fourth axis C is substantially perpendicular to the first Z and third B axes of rotation.

As seen in FIG. 14, the second inertial body 227 comprises a locking lug 229 which cooperates with a shoulder 243 of the transmission lever 211.

Moreover, a restoring spring 233, for example of the helicoidal type, makes it possible to return the second inertial body 227 into the inoperative position (FIG. 13).

The helicoidal spring 233 is in this case centered on the fourth axis of rotation C with one end in contact with a support of the base 205 and the other end in contact with the second inertial body 227.

Thus, in the event of a violent collision, the second inertial body 227 pivots, overcoming the force of the spring 233. Said spring causes the locking lug 229 to be displaced until it intercepts the shoulder 243 and locks the transmission lever 211 at the start of the rotation of the transmission lever 211.

Naturally, for locking the second inertial body in the operative position, it is possible to provide a resilient strip as disclosed in the first embodiment, or alternatively a locking wedge 235, as disclosed in the third embodiment (FIG. 13).

FIG. 15 illustrates a variant of said fifth embodiment in which a compression spring 219 is used for the first inertial body 217.

Figure 16:
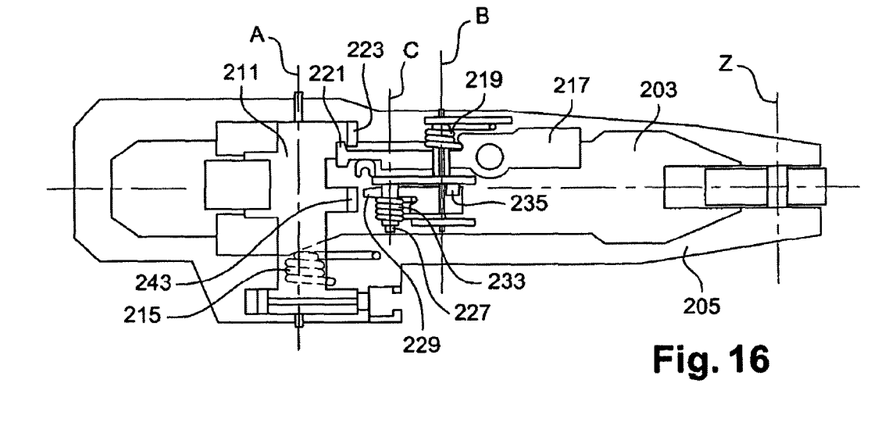
FIG. 16 shows a schematic view of the rear of the handle of FIG. 1 according to a sixth embodiment.

The sixth embodiment, illustrated in FIG. 16, differs from the fifth embodiment in that the second axis of rotation A of the transmission lever 211 is substantially parallel to the first axis of rotation Z and not perpendicular. Similarly, the fourth axis of rotation C is parallel to the third axis of rotation B and thus to the first axis of rotation Z.

In this case, as seen in FIG. 16, the second inertial body 227 is also in the vicinity of the first inertial body 217.

Moreover, the transmission lever 211 comprises two parallel branches, respectively extending toward the first 217 and second 227 inertial bodies. Each branch has a shoulder 223, 243 to cooperate with the first 217 and second 227 inertial bodies.

Thus it can be seen that such a safety system 9 with a first inertial body activated for low acceleration and a second inertial body activated for high acceleration, makes it possible to prevent untimely opening of the door whatever the acceleration during the collision.

Moreover, said safety system makes it possible to lock in a reversible manner the transmission lever or any other element of the kinematic system for opening a door leaf, in the event of collisions at low acceleration due to the first inertial body which prevents the handle from being completely locked, whilst ensuring the locking in a non-reversible manner, directly or indirectly, of the transmission lever due to the second inertial body, in the event of greater acceleration.

The invention claimed is:

1. A handle for a door leaf of an automobile, comprising:
   a gripping lever which is mobile in rotation relative to the door leaf about a first axis of rotation between an inoperative position and a control position for opening a lock of the door leaf;
   a transmission lever mounted in a base of the handle fixed to the door leaf, wherein the transmission lever is configured to be actuated by the gripping lever and to pivot about a second axis of rotation between an inoperative position and an operative position in which the transmission lever actuates the opening of the lock; and
   a safety system mounted in the base, configured to prevent the rotation of the transmission lever in the event of a collision,
   wherein the safety system comprises a first inertial body and a second inertial body that are pivotably mounted between an inoperative position and an operative position, and
   wherein during a low acceleration collision, the first inertial body moves in the operative position to prevent the rotation of the transmission lever in a reversible manner, and the second inertial body does not move.

2. The handle as claimed in claim 1,
   wherein the safety system further comprises a means for locking the second inertial body in the operative position, and
   wherein during a high acceleration collision, the second inertial body moves in the operative position to lock the transmission lever in rotation in a non-reversible manner, either directly, or by cooperating with the first inertial body.

3. The handle as claimed in claim 1, wherein the first inertial body comprises a locking lug which cooperates with a first shoulder of the transmission lever to lock the transmission lever in rotation in the event of the low acceleration collision.

4. The handle as claimed in claim 2, wherein the second inertial body comprises a locking lug which cooperates with a second shoulder of the transmission lever to lock the transmission lever in rotation, in a direct manner, in the event of the high acceleration collision.

5. The handle as claimed in claim 3, wherein the second inertial body is configured to lock the transmission lever by locking the first inertial body in the operative position.

6. The handle as claimed in claim 5, wherein the second inertial body has an opening to receive a protuberance of the first inertial body in the operative position.

7. The handle as claimed in claim 2, wherein the locking means of the second inertial body comprises a flexible strip cooperating with a projection of the second inertial body.

8. The handle as claimed in claim 2, wherein the locking means of the second inertial body comprises a locking wedge of substantially parallelepiped overall shape, arranged on the base opposite one end of the second inertial body, such that when the second inertial body pivots, the second inertial body:

slides along a longitudinal wall of the locking wedge in a first direction, then     slides along a side wall of the locking wedge in a second direction substantially perpendicular to the first direction, said side wall forming a stop locking the second inertial body in the operative position.

9. The handle as claimed in claim 1, wherein the second axis of rotation is substantially perpendicular to the first axis of rotation.

10. The handle as claimed in claim 1, wherein the second axis of rotation is substantially parallel to the first axis of rotation.

\* \* \* \* \*